Jan. 10, 1928.
W. C. LAUGHLIN
CENTRIFUGAL MACHINE
Filed Feb. 23, 1926 3 Sheets-Sheet 1
1,655,426
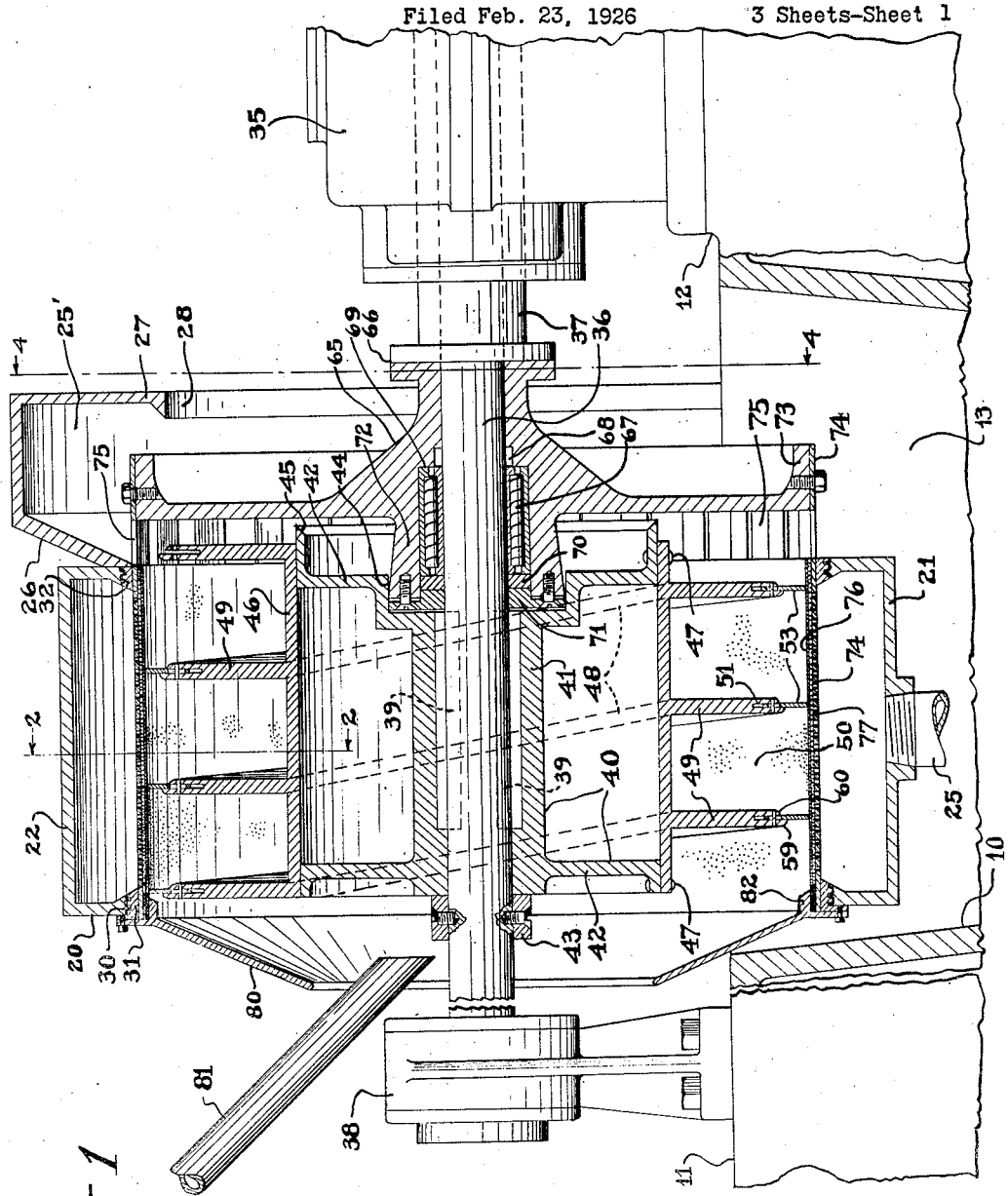
INVENTOR.
William C. Laughlin
BY
ATTORNEY

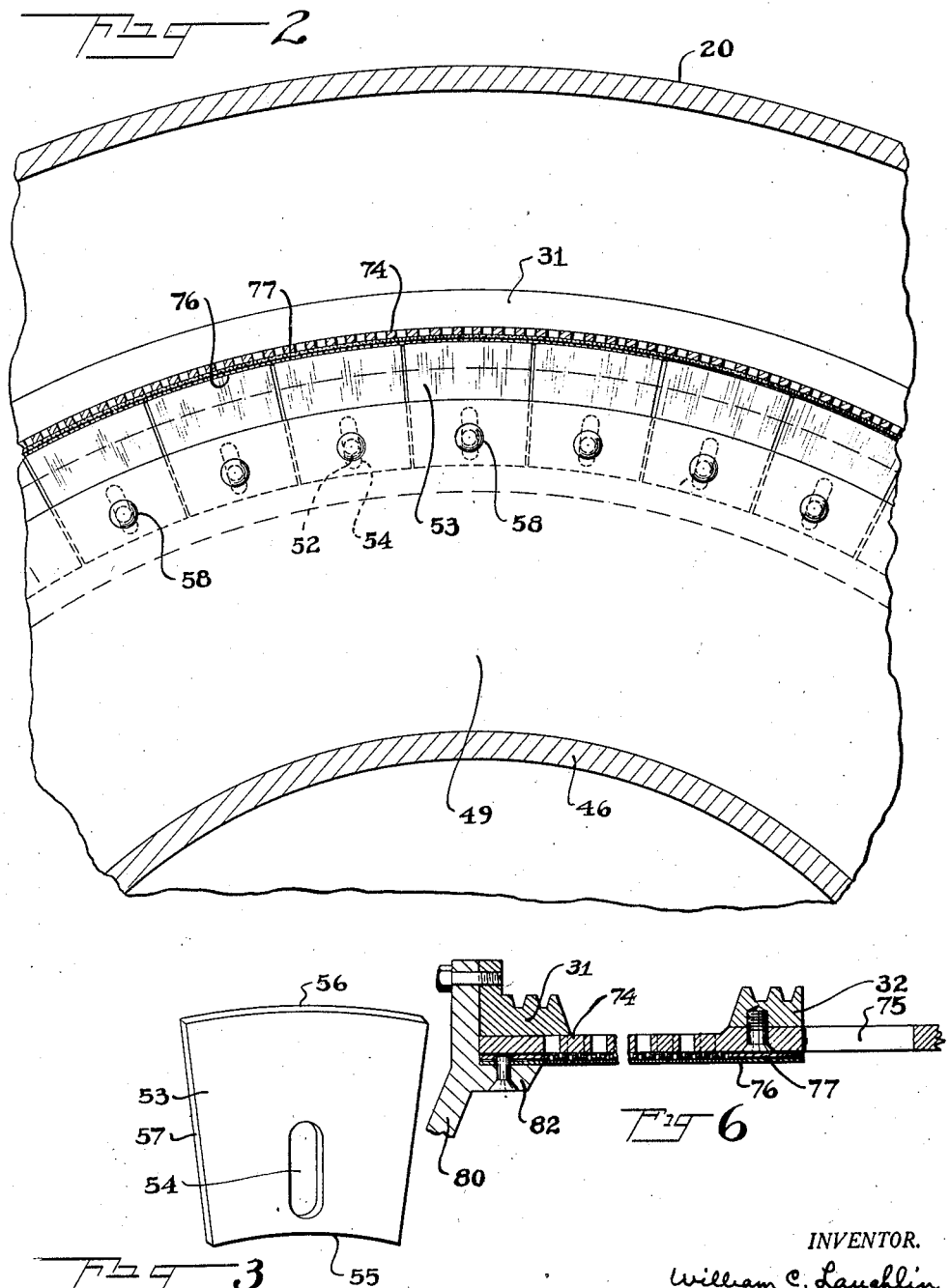

Jan. 10, 1928.
W. C. LAUGHLIN
1,655,426
CENTRIFUGAL MACHINE
Filed Feb. 23, 1926
3 Sheets-Sheet 3
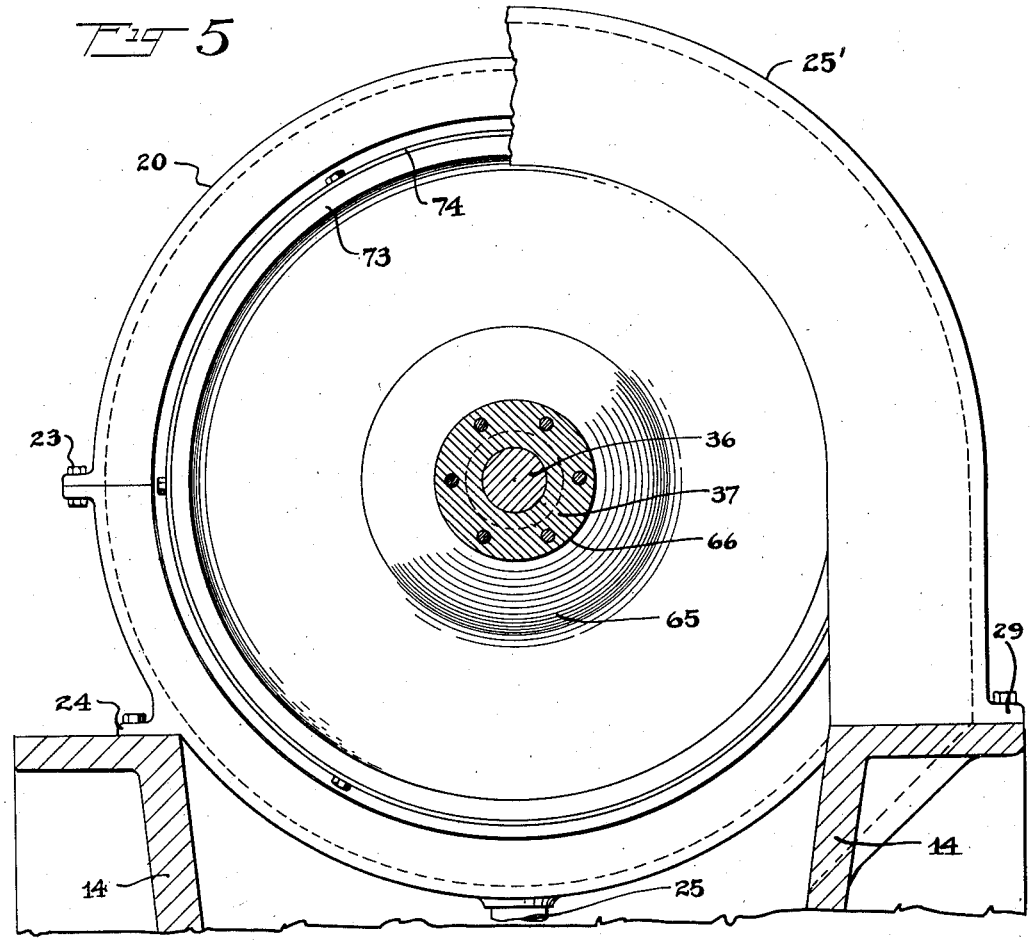
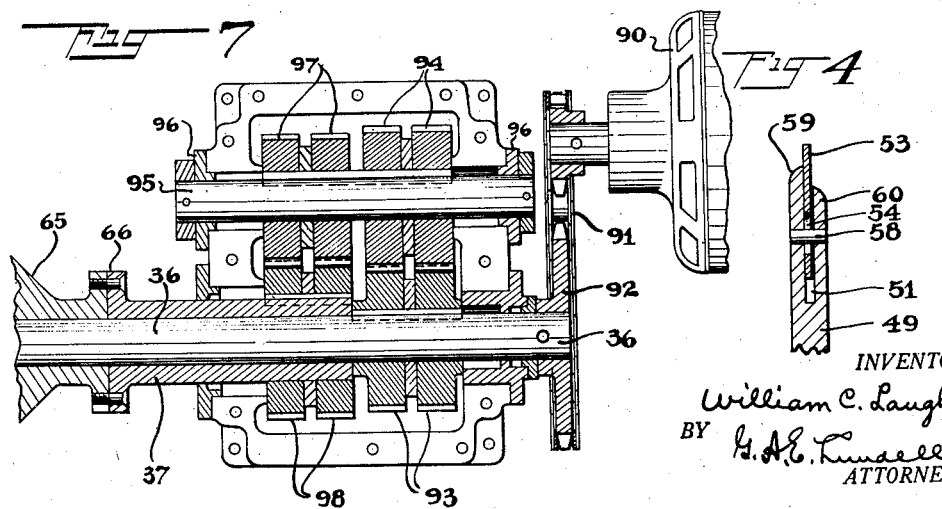
INVENTOR.
William C. Laughlin
BY
ATTORNEY Patented Jan. 10, 1928.

1,655,426

UNITED STATES PATENT OFFICE.

WILLIAM C. LAUGHLIN, OF GLENDALE, CALIFORNIA, ASSIGNOR TO LAUGHLIN FILTER CORPORATION, OF NEW YORK, N. Y., A CORPORATION OF DELAWARE.

CENTRIFUGAL MACHINE.

Application filed February 23, 1926. Serial No. 89,936.

This invention relates to centrifugal machines and more particularly to rotary filters for separating component parts of complex materials.

One object of the present invention is to provide a constantly driven rotary machine having a filtering screen in combination with means for maintaining the screen clear and clean.

Another feature relates to the provision of an independently movable blade mounted on the rotor of the machine and arranged to be acted upon by centrifugal force.

Another feature relates to the provision of a drum having a flange arranged to form a spiral and positioned within the confines of a perforated drum, both of the drums being driven but at relatively different speeds.

Another object of the invention is to provide a combination of elements which may be readily dismantled for purposes of cleaning, inspection and repair.

Another object relates to the provision of an improved blade for cleaning a filtering screen and for moving the blade with respect to the screen so as to provide a rolling action, thus effectively reducing wear on the parts.

Other objects will appear from the following description taken in connection with the accompanying drawings in which—

Figure 1 is a side elevation partly in section of one embodiment of the invention;

Figure 2 is a partial transverse section taken on the line 2—2 of Figure 1;

Figure 3 is a detailed view of one of the blades of Figure 2;

Figure 4 is an enlarged view of a portion of Figure 1;

Figure 5 is an end view, partly in section, and with parts broken away;

Figure 6 shows an enlarged view of the filter screen and reinforcement sheet of Figure 1; and Figure 7 is a sectional view of the power source of Figure 1.

Like reference characters refer to like parts in the several figures of the drawings.

In the following description and claims, parts will be identified by specific names for convenience of expression, but they are intended to be as generic in their application as the art will permit.

Referring to the drawings and more particularly to Figure 1, there is shown a base 10 having two pedestals 11, 12 spaced apart to form a pit 13 therebetween, and having lateral walls such as 14 (see Figure 5). The filtering mechanism is mounted immediately above the pit 13 so that a discharge of materials therefrom may be readily made directly into the pit.

A housing or water box 20, formed of a suitable metal such as cast iron or the like, is provided, and is formed of a lower portion 21, and an upper portion 22, the two portions being bolted together as at 23. The lower portion is provided with a flange 24, which is bolted to the upper faces of the base 10. The bottom of the water box 20 empties into a pipe 25 through which the filtrate is discharged.

Adjacent to one face of the water box 20 there is mounted a solid discharge box 25' clearly shown in Figures 1 and 5, formed of a suitable metal such as cast iron and having one end adjacent the water box 20. The end of the discharge box 25' is in the form of a truncated cone 26 closely fitted to the contiguous face of the water box 20. The opposite face 27 of the solid discharge box 25' is apertured as at 28 for ready access to the interior thereof. The solid discharge box is flanged as at 29 and is rigidly bolted or otherwise secured to the upper faces of the walls 14.

The end faces of the water box 20 are each provided with circular apertures of relatively less diameter than the box. The peripheries of these apertures are provided with petticoats, as at 30 (see Figure 1). A flanged ring 31, having petticoats to dovetail with those of the aperture, and formed of a material such as bronze or the like, is rotatably mounted in the left hand aperture of the water box 20, as seen in Figure 1. A ring 32, having petticoats to dovetail with those of the other aperture and formed of a material such as bronze or the like, is rotatably mounted in the right hand aperture. The rings 31 and 32 form parts of the filtering rotor to be described hereinafter.

For driving the rotors of the machine at relatively different speeds there is positioned on the pedestal 12 a source of power shown as at 35 having a central shaft 36 and a sleeve 37 rotatably mounted on the shaft 36 and concentric therewith. The outboard end of the shaft 36 is journalled on an inverted hanger 38 secured to the pedestal 11 in alignment with the power source 35. The shaft 36 is provided with keyways as at 39 and there is keyed thereto to rotate therewith a distributer rotor 40.

The distributer rotor 40 comprises an inner hub 41 having cupped flanges 42 at its ends, and is held in fixed longitudinal position on the shaft 36 by a collar 43. The collar is removably mounted on the shaft by suitable means such as set screws. The inner or right hand cupped flange (as seen in Figure 1) is recessed as by a shoulder 44, and the outer periphery is internally bevelled as at 45. The convex surfaces of the flanges are machined to receive a flanged drum 46, which is affixed to the hub 41 as by rivets 47. The flange of the drum 46 is arranged to form a spiral, the pitch angle being indicated by the dotted lines 48, 48 and the flange, indicated as at 49, is of sufficient depth to comprehend a considerable space 50 between the adjacent threads of the spiral.

The peripheral edges of the flange are slotted as at 51, and the tines thus formed are of unequal length. A plurality of transverse drill holes 52 is provided through the bifurcated rim of the flange at spaced points as shown in Figure 2. In the slot 51 is inserted a plurality of blades 53 of the type shown in Figure 3, formed of a metal of suitable weight such as aluminum or magnesium, or other metal, each having an elongated slot 54, and having a concave edge 55 conforming to the curvature of the bottom of the slot 51 and a convex edge 56 and lateral edges 57 forming radii with respect to an arc having its center on the axis of the shaft 36. The blades 53 are assembled to the distributor rotor drum 46 by being inserted with the concave edge 55 within the slot 51 and with the elongated slot 54 of the blade in alignment with a drill hole 52. A pin 58 is then inserted into the drill hole 52 and peened, thus providing a pin and slot connection between the blade and the drum. It is understood however that any other form of lost motion connection may be employed for the purpose without departing from the spirit of the invention. The bifurcations of the flange edge are of unequal length, that to the rear of the blade and shown to the left, as at 59 in Figures 1 and 4 being somewhat longer than that to the front, shown to the right as at 60.

The filtering rotor comprises a carriage element 65 formed of bronze or the like, loosely mounted on the shaft 36, and operatively connected to the driving sleeve 37 as by a flange coupling 66 of conventional form. A roller bearing 67 is provided between the carriage 65 and the shaft 36 to permit free relative movement thereof, and is lubricated from a grease hole 68 and a suitable grease cup (not shown). The bearing 67 is held in fixed longitudinal position between a shoulder 69 and a thrust washer 70 by a stuffing box 71 removably affixed to the end of the carriage. The carriage 65 includes a tapered hub 72 having its restricted diameter substantially in alignment with the periphery of the inner right hand flange 42 of the distributer rotor hub 41. The carriage 65 includes an enlarged portion 73 having its diameter commensurate with the internal diameter of the rings 31, 32, and there is secured thereto, and to the rings 31, 32, a perforated heavy filter screen 74, formed of bronze or the like, and retained in such position by the carriage and the rings so as to form a drum. The enlarged portion 73 of the carriage is spaced apart from the end 45 of the inner flange 42. The reenforcement screen 74 is provided with large apertures, such as 75 within the confines of the solid discharge box 25, and between the portion 73 of the carriage and the intermediate ring 32; and with relatively small openings, closely spaced, within the confines of the water box 20. Two filtering screens 76, 77 of suitable mesh to produce the desired filtrate, are fitted in the drum formed by the sheet 74 within the confines of the water box 20, (see Figures 1 and 6). The intermediate screen 77 serves as a backing screen and the interior screen 76 as a fine screen.

For feeding material to be acted upon into the machine, there is provided a tapered feed plate 80 removably secured to the flange of the flanged ring 31, and a feed pipe 81, terminates within the confines of the feed plate. The pipe 81 extends from a source of supply of material. The feed plate 80 includes an interiorly disposed flange 82 for clamping the screens 76 and 77 in fixed position. The power source 35 includes a driving motor 90 having its shaft operatively connected through a chain 91 to a sprocket 92 keyed to the shaft 36, it being understood that any other suitable structure for driving the shaft 36 may be employed. The shaft 36 has keyed thereon a gear 93 which is in mesh with a gear 94 keyed to a counter shaft 95. The counter shaft 95 is journaled in suitable bearings such as 96, in a well-known manner. A gear 97 relatively smaller in diameter than the gear 94 is keyed to the counter shaft 95 and is in mesh with a similar gear 98 keyed to the sleeve 37.

In operation the driving mechanism 35 is started and drives the sleeve 37, carriage 65, reinforcement screen 74, backing screen 77, fine screen 76 and plate 80 at a predetermined speed. It will be noted that the carriage 65 rotates freely with respect to the shaft 36 by virtue of the roller bearing 67. The rings, 31, 32 rotate freely with respect to the water box 20 and form a water seal. The power source 35 also drives the shaft 36 at a speed somewhat greater than the speed of the carriage 65 and screen 76, thus driving the rotor 40, the flange 49 and the blades 53 at a relatively greater speed. The difference in speed may be relatively small; for example the speed of the shaft 36 may be 800 revolutions and that of the carriage 65 794 revolutions per minute thus making a difference of six revolutions per minute between the speed of the carriage 65 and that of the shaft 36. The material is fed into the feed pipe 81 and is acted upon by the baldes 53 and carried progressively towards the right of Figure 1. The fine material is gradually filtered through the fine screen 76 by centrifugal force into the water box 20 and thus out through the pipe 25. The coarser material is gradualy carried over towards the right of Figure 1 by the blades 53 and such of it as is not filtered through the screen 76 is discharged outwardly through the relatively large apertures 75 in the heavy screen 74 and escapes into the pit 13. Such of the coarse material as is thrown by centrifugal force into the solid discharge box 25' falls down by gravity into the pit. It will be noted that the shape of the interior of the solid discharge box 25' is such as to direct the material into the pit 13, and that the flange 45 is formed so that a minimum of such discharged material can get into the recess enclosed thereby. Should the machine be stopped and the material last discharged find its way into this recess the hub 72 of the carriage 65 is so formed as to direct this material into the space between the edge of the flange 45 and the enlarged portion of the carriage 65.

On account of the difference in speeds of the filtering rotor and the distributing rotor there is an effective forward movement of the blades 53 with respect to the screen 76 and this produces a desirable pushing action of the material upon the blades. Furthermore the pressure of the blades upon the screen is dependent upon the centrifugal force, as the blades in contact with the screen 76 may move independently of the flange 49 to a limited extent. When the machine comes to rest the blades at the top of the machine fall to rest in their slot and out of contact with the upper portion of the screen 76. Upon starting up the machine again the blades take up their position in contact with the screen as before, so as to prevent clogging of the screen by the material.

It will thus be seen that I have provided a filtering machine which may be readily assembled and dismantled, by merely removing the feed plate 80 and sliding it together with the reinforcement sheet 74 and the screen 76 towards the left of Figure 1. Such parts as are subjected to wear may then be readily replaced.

It will also be seen that the contact of the blade with the screen is constant during the operation of the device so that the screen is free at all times to function and no binding of the screen apertures or building up of material over the screen openings is possible. The filtering operation is thus rendered reliable at all times independently of irregularities in the screen.

When the machine is in operation the force of contact of the blades upon the screen is proportional to the speed of the machine, and thus the filtering operation is rendered reliable at varying speeds.

The invention upon which this application is based is broader than the specific embodiment shown and described for the purpose of illustrating at least one of the ways in which it may be employed. The scope of the invention is therefore to be understood as not being limited by the present specific description. I intend no limitations other than those imposed by the claims.

What is claimed is:

1. A centrifugal machine comprising a rotatable drum having a filtering screen, a distributor within said drum having a spiral flange, and blades loosely mounted upon the periphery of said flange and controlled entirely by centrifugal force, said blades being in continuous contact with a surface of said screen.

2. A centrifugal machine comprising a rotatable drum having a cylindrical filtering screen, a distributor within said drum having a spiral flange, and blades loosely mounted upon the periphery of said flange and controlled entirely by centrifugal force, said blades being in continuous contact with the interior surface of said screen.

3. A centrifugal machine comprising a rotatable drum having a fine mesh screen, a distributor within said drum having a spiral flange, blades loosely mounted upon the periphery of said flange and controlled entirely by centrifugal force, and means to operate the drum and distributor at high speed to cause said blades to contact with a surface of the screen.

4. A centrifugal machine comprising a rotatable drum having a fine mesh screen and a perforated reinforcement screen therefor, to form a filter, a distributor within said drum having a spiral flange, blades loosely mounted upon the periphery of said flange and controlled entirely by centrifugal force, and means to operate the drum and distributor at relatively different speeds to cause said blades to contact with a surface of the screen.

5. A centrifugal machine comprising a rotor having a cylindrical filtering screen, a second rotor coaxial therewith and having a spiral flange, a plurality of movable plates in continuous contact with said screen and loosely mounted upon the periphery of said flange and controlled entirely by centrifugal force, and differential driving mechanism for actuating said rotors to move material to be acted upon across the surface of the filtering screen.

6. In a centrifugal machine, a filtering rotor comprising a cylindrical screen, a distributing rotor comprising a spiral flange with said screen, means for driving said rotors at relatively different speeds, and means having a continuous intimate contact with a surface of said screen loosely mounted on the periphery of the flange and controlled entirely by centrifugal force for progressively moving material across the surface of the screen.

7. A centrifugal machine, comprising a rotatable perforated drum having small perforations and large perforations, a filtering screen proximate the inner face of said drum and opposite the small perforations, a distributor positioned within the perforated drum for moving material over said screen perforations and having a spiral flange, a plurality of blades in continuous intimate contact with a surface of said screen, and mounted on the peripheral edge of the spiral flange and controlled entirely by centrifugal force, and a lost motion connection for securing each blade to the flange to permit contact of the outer edge of the blade with the filtering screen by the action of centrifugal force.

8. A centrifugal machine comprising a rotatable drum having a filtering screen, a screw conveyor within said drum and in axial alignment therewith, said conveyor having a groove in its peripheral spiral edge, and a plurality of blades loosely mounted in said groove and acted upon entirely by centrifugal force to maintain continuous contact with a surface of said screen.

9. A centrifugal machine comprising a rotatable drum having a cylindrical filtering screen, a screw conveyor within said drum and in axial alignment therewith and having a groove in its peripheral edge, a plurality of blades loosely mounted in said groove and acted upon entirely by centrifugal force to maintain continuous contact with the inner surface of said screen, and means including a gear mechanism to drive the drum and the conveyor at relatively different speeds effective to push the material being acted upon longitudinally.

10. A centrifugal machine for clarifying material comprising a rotor having a cylindrical filtering screen, a second rotor co-axial therewith including a screw conveyor, a plurality of movable plates loosely mounted upon the periphery of said conveyor and acted upon entirely by centrifugal force to maintain continuous contact with said screen, and differential driving mechanism for actuating said rotors to move material being acted upon in a direction substantially parallel to the axis of said rotors.

Signed at New York in the county of New York and State of New York this eighteenth day of February A. D. 1926.

WILLIAM C. LAUGHLIN.